March 3, 1931. J. P. MARTIN 1,795,258
SAFETY DRIVING CONNECTION
Original Filed March 5, 1927
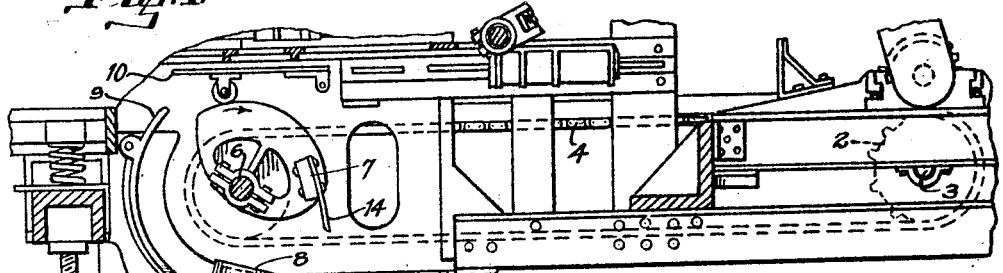
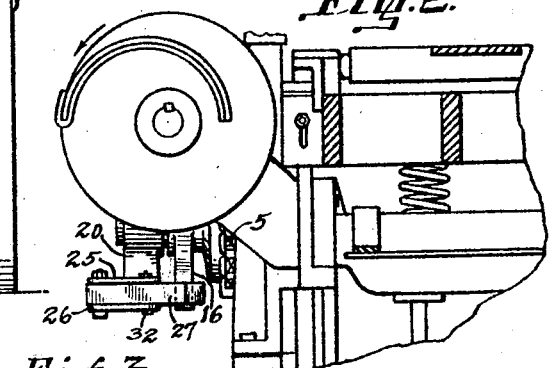
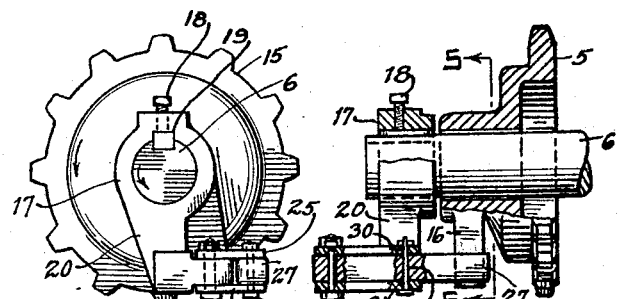
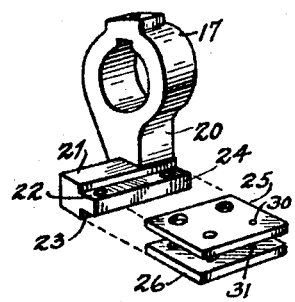
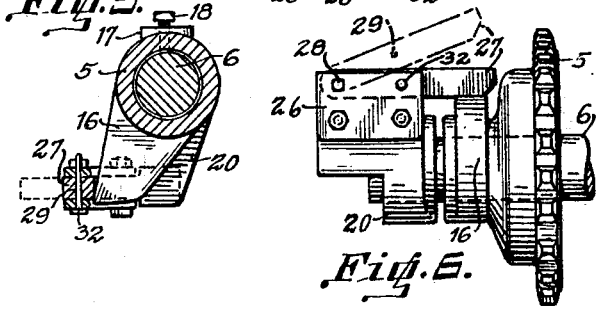
Inventor
James P. Martin
By Mason Fenwick & Lawrence
Attorneys Patented Mar. 3, 1931

1,795,258

UNITED STATES PATENT OFFICE

JAMES PRANGLEY MARTIN, OF LANCASTER, PENNSYLVANIA, ASSIGNOR TO LANCASTER IRON WORKS, INC., OF LANCASTER, PENNSYLVANIA

SAFETY DRIVING CONNECTION

Original application filed March 5, 1927, Serial No. 173,028. Divided and this application filed February 16, 1929. Serial No. 340,391.

This application is a division of my copending application, Serial No. 173,028, filed March 5, 1927.

The invention forming the subject matter of this application is a safety driving connection adapted to be interposed between a shaft, and means for driving the shaft in order to permit severance of the driving connection between the shaft and the driving means whenever any force resisting rotation of the shaft exceeds a predetermined value.

The invention is particularly adapted for use in automatic brick machines of the type disclosed in my said application. In the operation of this type of machine, a series of brick mold boxes are, at one stage of the operation, rotated in a sand box by brackets rigidly connected to said shaft. If, at any time, any of these molds should become jammed in the sander, it becomes necessary, in order to avoid serious damage to the whole machine, to make provision for immediately severing the driving connection between the shaft and the means for driving it.

In the prior machines, the jamming of the molds in the sander or receiving mechanism of this type of machine is taken care of by mounting a drive gear rotatable freely on the sander shaft and in lateral contact with a radial arm fixed to said shaft. The gear and arm are provided with holes adapted to register with each other and to receive a shear pin in order to impart the rotation of the gear, through the radial arm, to the sander shaft. The shear pin is generally made of material sufficiently hard to hold the radial arm in driven connection with the driving gear under normal working conditions only, and to shear just as soon as the molds become jammed in the sander or receiver, in order to prevent serious injury to the machine as a whole.

In the old form of safety shear connection between the drive gear and shaft, when the shear pin breaks and the machine is stopped to remove the jammed mold or other obstruction, it is necessary always to bring the radial arm and drive gear into that exact relative position in which the shear pin holes register exactly. This operation nearly always necessitates someone's getting down into the sand pit and working the shaft backwardly and forwardly until the shear pin holes are brought into exact registration. This is evidently an arduous, time consuming and costly operation.

The present invention is designed, and its object is, to obviate this drawback in the shear pin connection of prior devices by providing a safety connection between the shaft and drive gear which will permit the starting of the machine, after removal of the obstruction without necessitating the laborious operation of manually rotating the sander shaft into an exactly predetermined position relative to the drive gear.

Other objects of the invention will become apparent as the detailed description thereof proceeds.

In the drawings:

Fig. 1 is a fragmentary sectional elevation of the sander part of an automatic brick machine to which this invention is particularly adapted to be applied;

Fig. 2 is a fragmentary end elevation of part of the mechanism shown in Fig. 1;

Fig. 3 is a fragmentary sectional elevation of the shaft driving mechanism forming this invention;

Fig. 4 is a side elevation of the mechanism shown in Fig. 3;

Fig. 5 is a vertical section taken on the line 5—5 of Fig. 3;

Fig. 6 is side elevation of the mechanism shown in Figs. 3 and 4; and

Fig. 7 is an exploded perspective view of the shear plate arm for connecting the driving gear to the driven sander shaft.

As shown in Figure 1, the invention is adapted particularly for use in an automatic brick machine including supporting framework 1 on which is mounted a sprocket wheel 2 rotated on a stub shaft 3 by suitable gearing, forming no part of the present invention.

The sprocket wheel 2 imparts its rotation, through a sprocket chain 4, to a sprocket wheel 5, rotatably mounted on a shaft 6 to which is secured a cam member 7 adapted to engage with a sanded mold 8, in a certain cycle of operation of the machine, and to raise this mold 8 along the arcuate guide plate 9 onto the receiver plate 10, which drops in timed relation to the movement of the mold in position to receive the mold.

The shaft 6, by suitable gearing (not shown) drives the counter shaft 11, having secured thereto the substantially triangular frame 12 for moving the molds 8 through the sander box 13 into position to be engaged by plate 14 projecting from the cam member 7.

In order to transmit the rotation of the sprocket wheel 5 to the shaft 6, the hub 15 of the wheel 5 is provided with a radial arm 16 formed integral with said hub. A sleeve 17 is keyed to the shaft 6 and is adapted to be adjustably secured to said shaft by a set screw 18 screwthreaded through the sleeve and engaging the key 19.

An arm 20 extends radially from said sleeve 17, and is provided at its outer end with a lug 21 extending laterally from and perpendicularly to said arm. The lug 21 is provided with rabbets 22 and 23, to form a spacing tongue 24 on the opposite sides of which the steel shear plates 25 and 26 are bolted or otherwise suitably secured.

A hardened steel shear plate 27 has one end thereof pivoted between the plates 25 and 26, to swing about the pivot bolt 28 toward and from the tongue 24. This plate 27 is provided with an aperture 29 adapted to register with apertures 30 and 31, formed in the plates 25 and 26, respectively; and a shear pin 32 of relatively soft metal is inserted in the apertures 29, 30 and 31 when these apertures are in registry with each other.

As will be obvious from inspection of the drawing, when the shear plate 27 is secured by the shear pin 32 between the plates 25 and 26, the plate 27 will be in the path of movement of the arm 16. The contact between the arm 16 and the free end of shear plate 27 will cause the shaft 6 to be rotated by the sleeve 17 in the same direction as the sprocket wheel 5 is rotated by the sprocket chain 4.

The shear pin 32 is made of such material that under normal operation of the machine, it will hold the shear plate 27 locked between the plates 25 and 26, and will cause the shaft 6 to be rotated along with the sprocket wheel 5. As soon, however, as one of the molds 8 becomes jammed in the sander mechanism, the shear plate 27 will sever the shear pin 32 and permit the shaft 6 to stop, even though the sprocket wheel 5 continues to rotate thereon.

After the jammed mold 8 or other obstruction shall have been removed from the machine, it only becomes necessary to swing the plate 27 between the plates 25 and 26 into the path of movement of the arm 16, and to pin the plate 27 to the plates 25 and 26 by a new shear pin 32. It does not become necessary, at any time, to aline or register the arm 20 with the arm 16, as all that is required is to ensure the positioning of the shear plate 27 in the path of rotation of the radial arm 16, in order to transmit the rotation of said arm to shafts 6 and 11.

What I claim is:

1. In a machine, a shaft, a gear rotatable thereon, and having a hub integral therewith, an arm extending from said hub and having an edge substantially parallel to a diameter of said shaft, a second arm fixed to said shaft and extending radially therefrom, a pair of steel plates secured to the outer end of said second arm and extending beyond said outer end to form a recess, a steel plate having one end pivoted between said pair of plates at one end thereof and adapted when positioned in said recess to have its free end contact with the said edge.

2. In a machine, a shaft, a gear rotatable thereon, and having an arm fixed thereto, said arm having an edge parallel to a diameter of said shaft, a second arm fixed to said shaft adjacent the first named arm, a rod pivoted at one end to said second arm and extending parallel to said shaft with one of its sides in driven contact with the said edge, and shearable means engaging said arm and plate to hold the latter in driven engagement with said edge.

3. In a machine, a shaft, a sprocket wheel rotatable on said shaft, means for rotating said wheel, an arm fixed to said wheel and having an edge parallel to a diameter of said shaft, a second arm fixed to said shaft and having a recess at the free end thereof, a plate seated in said recess and having an edge thereof in driven contact with the said edge of said plate, and shearable means for holding said plate seated in said recess.

4. In a machine, rotatable driving and driven members, one of said members having a shear device pivotally mounted to move substantially tangentially to the direction of rotation of said member in yielding to an overcoming force, the other member being engageable with said shear device whereby, normally, said members rotate together.

5. In a machine, rotatable driving and driven members, one of said members having a shear device including a blade hingedly supported to swing in a plane tangential to the direction of rotation of said member, a shear pin normally inhibiting the swinging of said blade, means carried by the other member engageable with said blade stressing it in the direction in which it is adapted to swing, said shear pin having a strength value permitting it to break when a predetermined magnitude of said stress is exceeded.

6. In a machine, a shaft, an imperforate arm fixed to said shaft and extending radially therefrom, a second imperforate arm rotatable freely on said shaft, means for rotating said second arm on said shaft, and a pin extending substantially parallel to said shaft from the first named arm to contact with an edge of the other arm and thereby rotate said shaft.

In testimony whereof I affix my signature.

JAMES PRANGLEY MARTIN.